United States Patent
Watanabe et al.

(10) Patent No.: US 11,067,320 B2
(45) Date of Patent: Jul. 20, 2021

(54) GAS RECOVERY SYSTEM FOR COMPRESSOR, COMPRESSOR SYSTEM, AND REFRIGERATION CYCLE SYSTEM

(71) Applicant: MITSUBISHI HEAVY INDUSTRIES COMPRESSOR CORPORATION, Tokyo (JP)

(72) Inventors: Takuya Watanabe, Hiroshima (JP); Koichi Mizushita, Hiroshima (JP); Tomoaki Takeda, Hiroshima (JP); Yasushi Mori, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 321 days.

(21) Appl. No.: 15/538,436

(22) PCT Filed: Mar. 25, 2015

(86) PCT No.: PCT/JP2015/059144
§ 371 (c)(1),
(2) Date: Jun. 21, 2017

(87) PCT Pub. No.: WO2016/103744
PCT Pub. Date: Jun. 30, 2016

(65) Prior Publication Data
US 2017/0343257 A1 Nov. 30, 2017

(30) Foreign Application Priority Data
Dec. 26, 2014 (WO) .................. PCT/JP2014/084606

(51) Int. Cl.
*F25B 43/02* (2006.01)
*F04D 29/12* (2006.01)
(Continued)

(52) U.S. Cl.
CPC .............. *F25B 43/02* (2013.01); *F04D 29/10* (2013.01); *F04D 29/124* (2013.01);
(Continued)

(58) Field of Classification Search
CPC ...... F25B 43/022; F25B 43/043; F04D 29/10; F04D 29/104; F04D 29/108; F04D 29/124; F04D 29/102; F04D 29/122; F16J 15/40
(Continued)

(56) References Cited

U.S. PATENT DOCUMENTS 3,186,182 A   6/1965 Grossmann et al.
3,524,897 A * 8/1970 Ludwig ..................... C07C 7/04
                                                           585/634

(Continued)

FOREIGN PATENT DOCUMENTS

EP   0 725 256 A1   8/1996
JP   2005-9715 A    1/2005
(Continued)

OTHER PUBLICATIONS

International Search Report (Form PCT/ISA/210) issued in International Application No. PCT/JP2014/084606 dated Mar. 10, 2015, together with an English translation.
(Continued)

*Primary Examiner* — Tavia Sullens
(74) *Attorney, Agent, or Firm* — Birch, Stewart, Kolasch & Birch, LLP.

(57) ABSTRACT

A gas recovery system for a compressor, said gas recovery system being equipped with: a distillation column that brings a supply gas in a liquid state into contact with a mixed gas, thereby cooling and liquefying a process gas in the mixed gas, and heating and gasifying the liquid supply gas; a process gas recovery line that is connected to the lower
(Continued)

part of the distillation column and recovers the liquid process gas discharged from the distillation column; and a supply gas recovery line that is connected to the upper part of the distillation column and recovers the gaseous supply gas discharged from the distillation column.

9 Claims, 7 Drawing Sheets

(51) Int. Cl.
    *F25B 31/00*     (2006.01)
    *F04D 29/10*     (2006.01)
    *F25B 43/04*     (2006.01)
    *F25B 45/00*     (2006.01)

(52) U.S. Cl.
    CPC .......... *F25B 31/004* (2013.01); *F25B 43/043* (2013.01); *F05D 2260/6022* (2013.01); *F25B 45/00* (2013.01); *F25J 2200/40* (2013.01); *Y02C 20/40* (2020.08)

(58) Field of Classification Search
USPC ........................................ 277/408, 431, 432
See application file for complete search history.

(56) References Cited

U.S. PATENT DOCUMENTS

| | | | | |
|---|---|---|---|---|
| 3,795,460 A | * | 3/1974 | Endo | ..................... F04D 29/104 |
| | | | | 415/175 |
| 3,797,963 A | * | 3/1974 | Endo | ..................... F04D 29/104 |
| | | | | 415/175 |
| 4,311,004 A | | 1/1982 | du Pont | |
| 4,495,035 A | | 1/1985 | Swearingen | |
| 5,749,245 A | | 5/1998 | Thomas et al. | |
| 2010/0254811 A1 | | 10/2010 | Kuzdzal et al. | |
| 2012/0279239 A1 | | 11/2012 | Bernhardt et al. | |
| 2013/0170961 A1 | * | 7/2013 | Meucci | .................. F04D 29/122 |
| | | | | 415/170.1 |

FOREIGN PATENT DOCUMENTS

JP            3816066 B2     8/2006
WO    WO 2013/166608 A1    11/2013

OTHER PUBLICATIONS

International Search Report (Form PCT/ISA/210) issued in International Application No. PCT/JP2015/059144 dated Jun. 16, 2015, together with an English translation.

Written Opinion of the International Searching Authority (Form PCT/ISA/237) issued in International Application No. PCT/JP2014/084606 dated Mar. 10, 2015, together with an English translation.

Written Opinion of the International Searching Authority (Form PCT/ISA/237) issued in International Application No. PCT/JP2015/059144 dated Jun. 16, 2015, together with an English translation.

\* cited by examiner

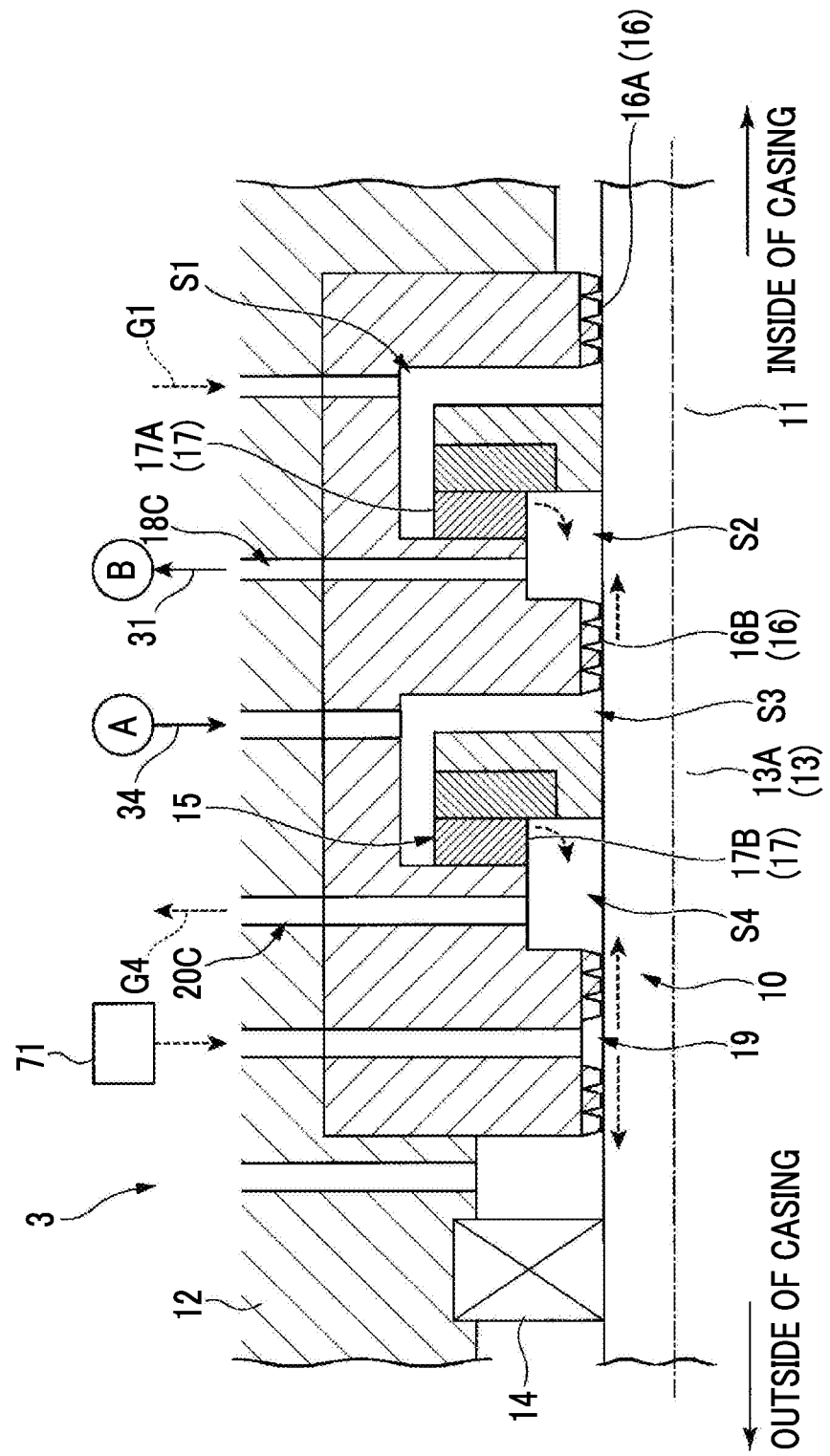

GAS RECOVERY SYSTEM FOR COMPRESSOR, COMPRESSOR SYSTEM, AND REFRIGERATION CYCLE SYSTEM

TECHNICAL FIELD

The present invention relates to a gas recovery system for a compressor, a compressor system including the same, and a refrigeration cycle system.

BACKGROUND ART

In compressors, a dry gas seal is provided in order to prevent a gas (process gas) compressed inside a compressor from leaking from a gap between a rotating body (rotor) and a stationary body (stator) at each end portion of a casing. Additionally, in order to prevent lubricating oil from being mixed into a dry gas seal side from a bearing outside the dry gas seal, the mixing of the lubricating oil is prevented by further providing a seal referred to as a separation seal between the dry gas seal and the bearing and supplying inert gas (separation gas) to the separation seal. A gas (hereinafter referred to as a mixed gas) in which a minute amount of the process gas, which leaks out from the dry gas seal to the outside, and the aforementioned separation gas are mixed together is discharged as a vent gas from the compressor.

PTL 1 discloses a recovered fluorocarbon regeneration method for removing impurities, such as oil and moisture, which are contained in the recovered fluorocarbon, from the recovered fluorocarbon. In this regeneration method, the fluorocarbon is separated from impurities, such as oil and moisture in a liquid state, by heating the recovered fluorocarbon in a liquid state in an evaporator and gasifying the fluorocarbon contained in the recovered fluorocarbon.

CITATION LIST

Patent Literature

[PTL 1] Japanese Patent No. 3816066

SUMMARY OF INVENTION

Technical Problem

In the above-mentioned compressor, if the mixed gas is discharged as the vent gas from the dry gas seal, it is necessary to additionally supply the process gas in a closed loop system, and the running cost of the compressor becomes high by an amount such that the process gas is added. For example, in a case where the process gas is expensive like the Freon, the running cost of the compressor will be particularly high.

In a case where the process gas is separated and recovered from the above-mentioned mixed gas using the regeneration method of PTL 1, it is necessary to liquefy all the mixed gas. For this reason, the running cost of the compressor will be high by the amount of energy required for the liquefaction of the mixed gas.

The above problem may occur not only in a case where the separation gas is supplied to the separation seal but also in a case where the supply gas, such as the separation gas or other seal gas, is supplied to a seal portion of the compressor including the dry gas seal and the separation seal.

An object of an aspect of the invention is to provide a gas recovery system for a compressor, a compressor system including the same, and a refrigeration cycle system capable of reducing the amount of a process gas additionally supplied to a compressor and reducing the running cost of the compressor.

Solution to Problem

A gas recovery system for a compressor as an aspect of the invention is a gas recovery system for a compressor that separates a mixed gas, in which a process gas compressed by a compressor is mixed with a supply gas supplied to a seal portion of the compressor, into the process gas and the supply gas and recovers the mixed gas. The gas recovery system for a compressor includes a distillation column that brings the supply gas in a liquid state into contact with the mixed gas, thereby exchanging heat between exchanging heat between the mixed gas and the liquid supply gas to cool and liquefy a process gas contained in the mixed gas, and heat and gasify the liquid supply gas; a process gas recovery line that is connected to a lower part of the distillation column and recovers the liquid process gas discharged from the lower part of the distillation column; and a supply gas recovery line that is connected to an upper part of the distillation column and recovers the supply gas in a gas state discharged from the upper part of the distillation column.

In the gas recovery system of the above configuration, the process gas contained in the mixed gas is liquefied by exchanging heat between the mixed gas and the liquid supply gas in the distillation column, and the liquid process gas is recovered by the process gas recovery line. The recovered process gas can be returned to the compressor and reused. Hence, the amount of the process gas additionally supplied to the compressor can be reduced.

Additionally, the liquid supply gas that exchanges heat with the mixed gas in the distillation column is heated and gasified and is recovered in a gas state by the supply gas recovery line together with the supply gas contained in the mixed gas. The recovered gaseous supply gas can be reused as the gas supplied to the seal portion of the compressor. Hence, the amount of the supply gas supplied from an external supply source to the compressor can also be reduced.

In the gas recovery system for a compressor, the process gas may be Freon or hydrocarbon, and the supply gas may be carbon dioxide or hydrocarbon.

In a case where the process gas treated in the gas recovery system of the above configuration is expensive Freon, the running cost of the compressor can be effectively reduced.

Additionally, in a case where the supply gas treated in the compressor is the carbon dioxide that is a kind of inert gas, the mixed gas can be suitably separated into the Freon in a liquid state, and the carbon dioxide in a gas state in the distillation column.

The gas recovery system for a compressor may further include a process gas circulation line that branches from the process gas recovery line and returns the liquid process gas, which is discharged from the distillation column, to the distillation column after being gasified.

According to the above configuration, the purity of the liquid process gas discharged from the distillation column can be enhanced. That is, it is possible to recover the process gas with high purity from the mixed gas.

The gas recovery system for a compressor may further include a process gas supply line that supplies the gaseous process gas, which is treated in the compressor, to the distillation column, instead of the process gas circulation line.

According to the above configuration, the purity of the liquid process gas discharged from the distillation column can be enhanced. That is, the process gas with high purity can be recovered from the mixed gas.

The gas recovery system for a compressor may further include a supply gas circulation line that branches from the supply gas recovery line and returns the gaseous supply gas, which is discharged from the distillation column, to the distillation column after being liquefied.

According to the above configuration, the purity of the gaseous supply gas discharged from the distillation column can be enhanced. That is, it is possible to recover the supply gas with high purity from the mixed gas.

The gas recovery system for a compressor may further include an external supply line that supplies the liquid supply gas to the distillation column, instead of the supply gas circulation line.

According to the above configuration, the purity of the gaseous supply gas discharged from the distillation column can be enhanced. That is, it is possible to recover the supply gas with high purity from the mixed gas.

The gas recovery system for a compressor may further include a process gas circulation line that branches from the process gas recovery line and returns the process gas in a liquid state, which is discharged from the distillation column, to the distillation column after being gasified; a supply gas circulation line that branches from the supply gas recovery line and returns the gaseous supply gas, which is discharged from the distillation column, to the distillation column after being liquefied; and a circulation heat exchanger that exchanges heat between the liquid process gas flowing through the process gas circulation line and the gaseous supply gas flowing through the supply gas circulation line.

According to the above configuration, in the circulation heat exchanger, the liquid process gas flowing through the process gas circulation line can be heated by the gaseous supply gas flowing through the supply gas circulation line. Accordingly, the gasification of the process gas in the process gas circulation line can be promoted. Additionally, in the circulation heat exchanger, the gaseous supply gas flowing through the supply gas circulation line can be cooled by the liquid process gas flowing through the process gas circulation line. Accordingly, the liquefaction of the supply gas in the supply gas circulation line can be promoted.

Additionally, according to the above configuration, the heating of the process gas and cooling of the supply gas are performed by the heat exchange between these process gas and supply gas. That is, since the heating of the process gas and the cooling of the supply gas can be performed without using a separate heat source, the running cost of the gas recovery system can be reduced.

The gas recovery system for a compressor may further include a mixed gas supply line that is connected to the distillation column and supplies the mixed gas to the distillation column; and a mixed gas heat exchanger that exchanges heat between the process gas flowing through the process gas recovery line and the mixed gas flowing through the mixed gas supply line, thereby cooling the mixed gas with the process gas flowing through the process gas recovery line.

According to the above configuration, since at least a portion of the mixed gas can be liquefied by cooling the mixed gas in the mixed gas heat exchanger, at least the mixed gas in a gas-liquid mixed state can be supplied to the distillation column. Accordingly, in the distillation column, the mixed gas can be efficiently separated into the process gas and the supply gas. Additionally, since the mixed gas is cooled using the process gas flowing through the process gas recovery line, the running cost of the gas recovery system can be reduced.

The gas recovery system for a compressor may further include an additional supply line for additionally supplying the liquid process gas to the process gas recovery line, between the distillation column and the mixed gas heat exchanger.

According to the above configuration, by additionally supplying the liquid process gas on the upstream side of the mixed gas heat exchanger, in the mixed gas heat exchanger, it is possible to adjust the heat balance between the mixed gas flowing through the mixed gas supply line and the process gas flowing through the process gas recovery line and to appropriately adjust such a degree that the mixed gas is cooled.

In the gas recovery system for a compressor, the mixed gas heat exchanger may exchange heat between the supply gas flowing through the supply gas recovery line and the mixed gas flowing through the mixed gas supply line, thereby cooling the mixed gas with the supply gas flowing through the supply gas recovery line.

According to the above configuration, since the mixed gas is also cooled by using the supply gas flowing through the supply gas recovery line, it is possible to reduce the amount of the liquid process gas additionally supplied to the process gas recovery line.

In the gas recovery system for a compressor, the seal portion may include a dry gas seal, and a separation seal installed between a bearing of the compressor and the dry gas seal, and the supply gas may be a separation gas supplied to the separation seal.

According to the above configuration, even if the separation gas supplied to the separation seal is mixed with the process gas, the separation gas can be separated from the process gas and recovered. Additionally, the recovered gaseous separation gas can be reused as the gas supplied to the separation seal of the compressor. Hence, the amount of the separation gas supplied from an external supply source to the compressor can be reduced.

The gas recovery system for a compressor may further include a second distillation column that brings the separation gas in a liquid state into a second mixed gas in which the separation gas is mixed with lubricating oil from the bearing of the compressor, thereby exchanging heat between the second mixed gas and the liquid separation gas to cool and liquefy the lubricating oil contained in the second mixed gas, and heat and gasify the liquid separation gas; and a second supply gas recovery line that is connected to an upper part of the second distillation column and recovers the separation gas in a gas state discharged from the upper part of the distillation column.

According to the above configuration, by exchanging heat between the second mixed gas and the liquid separation gas in the second distillation column, the liquid separation gas is heated and gasified, and is recovered by the second supply gas recovery line together with the separation gas contained in the second mixed gas. The recovered separation gas can be reused as the gas supplied to the separation seal of the compressor. Hence, the amount of the separation gas supplied from the external supply source to the compressor can be further reduced.

In the gas recovery system for a compressor, the seal portion may include a plurality of dry gas seals, and the supply gas may be a seal gas supplied between the dry gas seals adjacent to each other.

According to the above configuration, even if the seal gas supplied between the dry gas seals is mixed with the process gas, the seal gas can be separated from the process gas and recovered. Additionally, the recovered gaseous seal gas can be reused as the gas supplied between the dry gas seals of the compressor. Hence, the amount of the seal gas supplied from an external supply source to the compressor can be reduced.

A compressor system as an aspect of the invention may further include a compressor; and the gas recovery system for a compressor.

A refrigeration cycle system as an aspect of the invention includes the compressor system.

Advantageous Effects of Invention

According to the invention, the amount of the process gas or supply gas additionally supplied to the compressor can be reduced, and the running cost of the compressor can be reduced.

BRIEF DESCRIPTION OF DRAWINGS

FIG. 7 is a view illustrating main parts of a compressor related to a fourth embodiment of the invention.

DESCRIPTION OF EMBODIMENTS

Hereinafter, embodiments for carrying out a gas recovery system for a compressor, a compressor system including the same, and a refrigeration cycle system according to the invention will be described with reference to the accompanying drawings. However, the invention is not limited only to these embodiments.

First Embodiment

Figure 1:
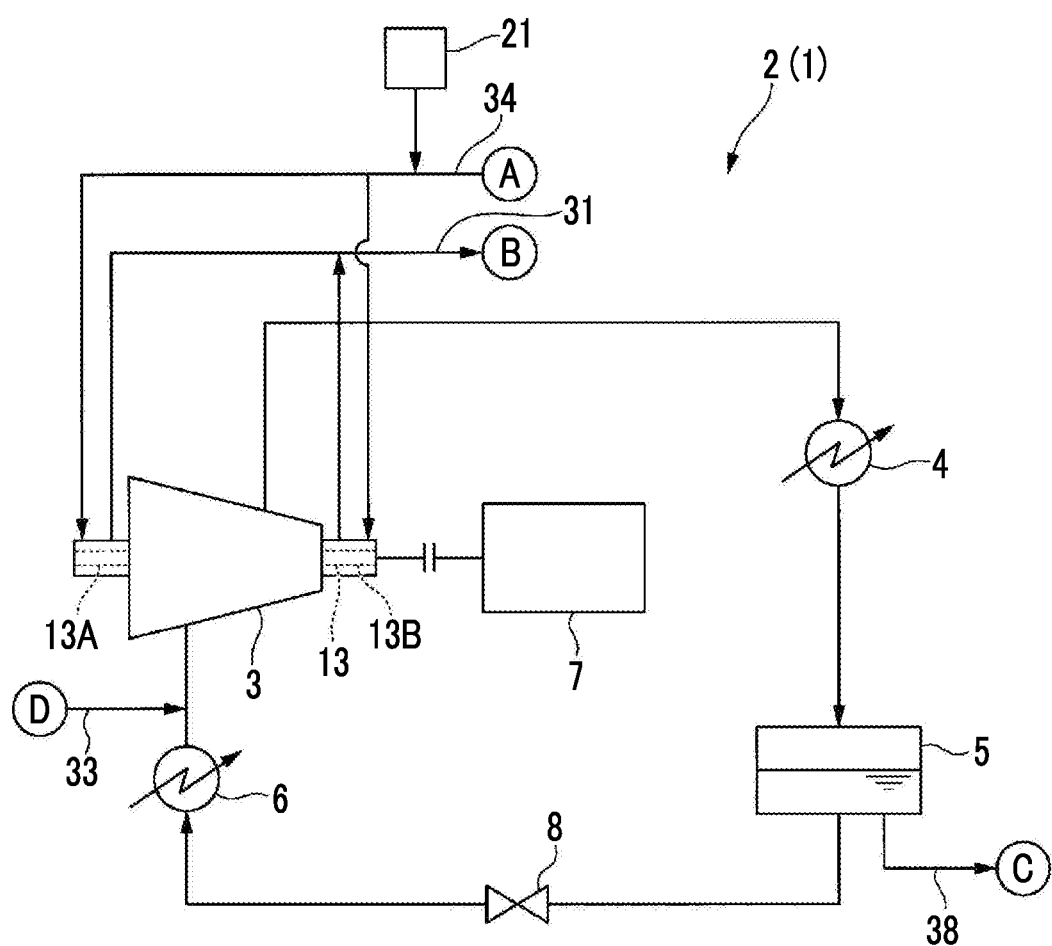
FIG. 1 is a schematic view illustrating a principal section of a refrigeration cycle system related to a first embodiment of the invention.

As illustrated in FIG. 1, a refrigeration cycle system 1 related to a first embodiment of the invention is a system for cooling a cooling target (not illustrated). A principal section 2 of the refrigeration cycle system 1 includes a compressor 3, a condenser 4, a storage portion 5, and an evaporator 6. These components are connected together by lines in the order listed above.

The compressor 3 compresses a refrigerant (hereinafter referred to as a process gas) in a gas state. A driving machine 7, such as a motor, which drives a rotor 11 (refer to FIG. 2) of the compressor 3, is connected to the rotor. The condenser 4 cools and condenses a high-temperature and high-pressure process gas compressed in the compressor 3.

The storage portion 5 stores the process gas turning into a liquid state in the condenser 4. The evaporator 6 exchanges heat between the liquid process gas supplied from the storage portion 5 in a state where pressure and temperature have dropped by adiabatically expanded by a valve 8, and a cooling target (not illustrated), and thus the evaporator evaporates (gasifies) the liquid process gas. The gasified process gas is again fed into the compressor 3.

Although the above process gas may be, for example, hydrocarbon, the process gas of the present embodiment is Freon. The hydrocarbon used as the process gas may be one kind or a plurality of kinds of hydrocarbons appropriately selected from, for example, methane, ethane, propane, butane, and the like.

Figure 2:
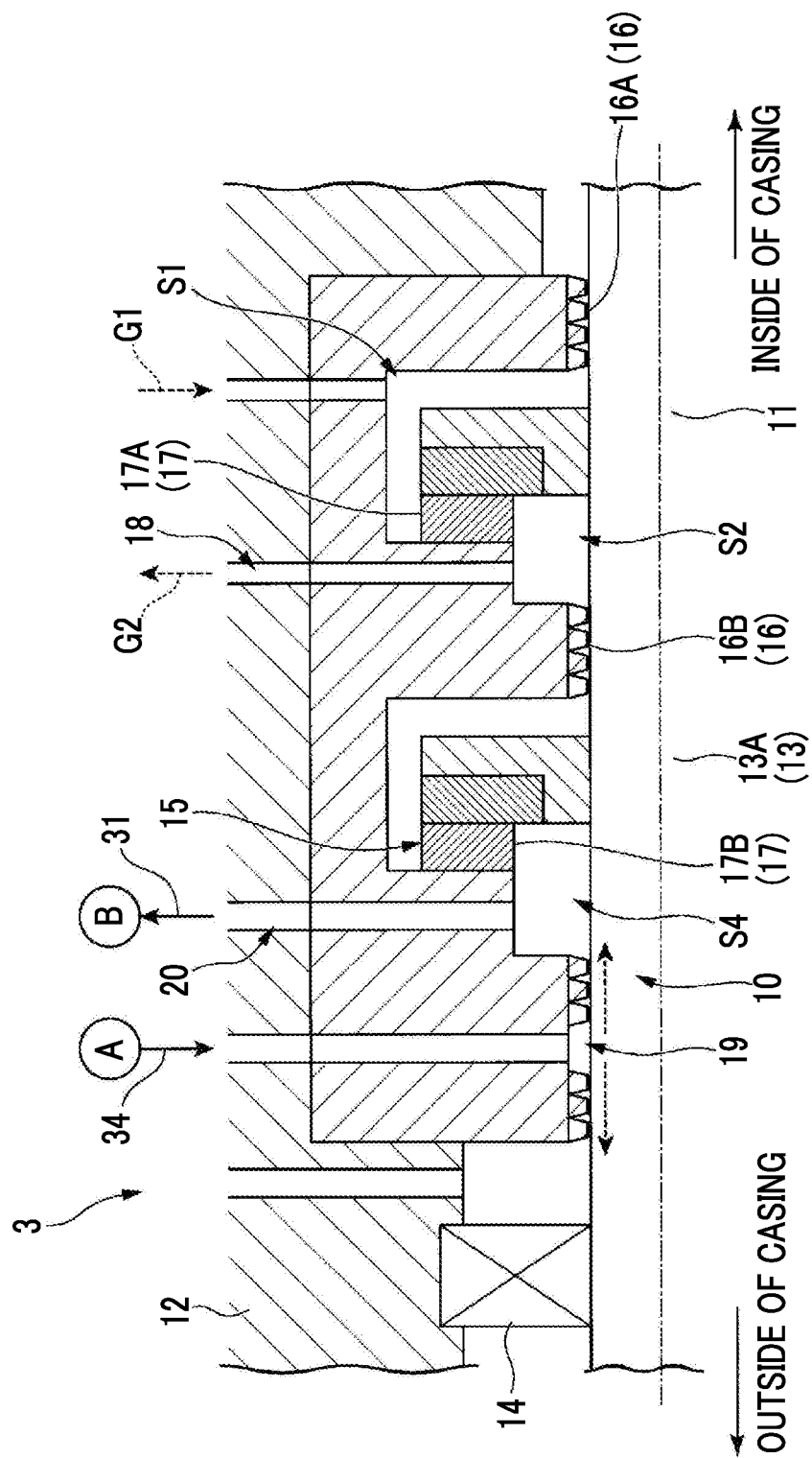
FIG. 2 is a half-sectional view illustrating main parts of a compressor of FIG. 1.

As illustrated in FIGS. 1 and 2, the rotor 11 of the above-mentioned compressor 3 includes a rotary shaft 13 and an impeller (not illustrated) attached to this rotary shaft. A stator 12 of the compressor 3 includes a casing (not illustrated) that houses the impeller of the rotor 11. The rotary shaft 13 has both end portions 13A and 13B in an axial direction protruding to the outside of the casing and is rotatably supported with respect to the stator 12 by a bearing 14 outside the casing. Although a state where only the first end portion 13A of the rotary shaft 13 in the axial direction is supported with respect to the stator 12 by the bearing 14 is described in FIG. 2, the second end portion 13B of the rotary shaft 13 in the axial direction is similarly supported by the bearing 14.

A seal portion 10 is provided in a gap between the stator 12 and the rotor 11 in both the end portions 13A and 13B of the rotary shaft 13. The seal portion 10 includes a leakage preventing seal portion 15 that prevents the aforementioned process gas from leaking from the inside of the casing to the outside thereof. The leakage preventing seal portion 15 is located inside the casing from the bearing 14 in the axial direction of the rotary shaft 13.

A labyrinth seal 16 and a dry gas seal 17 are included in the leakage preventing seal portion 15. In the present embodiment, a first labyrinth seal 16A, a first dry gas seal 17A, a second labyrinth seal 16B, and a second dry gas seal 17B are arrayed in order from the inside of the casing to the outside thereof in the axial direction of the rotary shaft 13.

A process gas after a portion of the process gas compressed in the compressor 3 has passed through a filter is supplied to a first space S1 between the first labyrinth seal 16A and the first dry gas seal 17A as a sealing process gas G1. By supplying the sealing process gas G1 to the first space S1, the pressure of the first space S1 rises, and leakage of the process gas containing foreign matter larger than 3 μm from the inside of the casing to the first space S1 is prevented.

A primary vent 18 for discharging a portion of a process gas that has leaked through the first dry gas seal 17A from the first space S1 is connected to a second space S2 between the first dry gas seal 17A and the second labyrinth seal 16B. The purity of a process gas G2 discharged from the primary vent 18 is 100%. For this reason, the process gas G2 discharged from the primary vent 18 is returned to the principal section 2 of the refrigeration cycle system 1 illustrated in FIG. 1 after the pressure thereof is appropriately raised again.

Additionally, the seal portion 10 includes a separation seal 19 that is installed between the above-mentioned leakage preventing seal portion 15 and bearing 14. The separation seal 19 supplies a separation gas (supply gas) in a gas state, thereby preventing the lubricating oil used in the bearing 14 from being mixed into the leakage preventing seal portion 15 including the dry gas seal 17.

Although the separation gas used in the separation seal 19 is supplied only from an external supply source 21 illustrated in FIG. 1, in the present embodiment, the separation gas recovered in a gas recovery system 30 (refer to FIG. 3) to be described below is also used. Additionally, although the above separation gas just has to be an inert gas, for example, the separation gas may be a gas of which the boiling point is lower than that of the process gas. Although this kind of separation gas may be, for example, nitrogen, the separation gas of the present embodiment is carbon dioxide.

In a space S4 (hereinafter referred to as a mixing space S4) between the leakage preventing seal portion 15 and the separation seal 19 in the gap between the stator 12 and the rotor 11, a minute amount of the process gas that has leaked from the leakage preventing seal portion 15, and the separation gas from the separation seal 19 are mixed together. A secondary vent 20 for discharging the mixed gas, in which the process gas and the separation gas are mixed together, from the mixing space S4 to the gas recovery system 30 to be described below, is connected to the mixing space S4.

Although only a state where components, such as the above-mentioned leakage preventing seal portion 15 and separation seal 19, are provided at the first end portion 13A of the rotary shaft 13, is described in FIG. 2, the components, such as the leakage preventing seal portion 15 and the separation seal 19, are similarly provided at the second end portion 13B of the rotary shaft 13.

Figure 3:
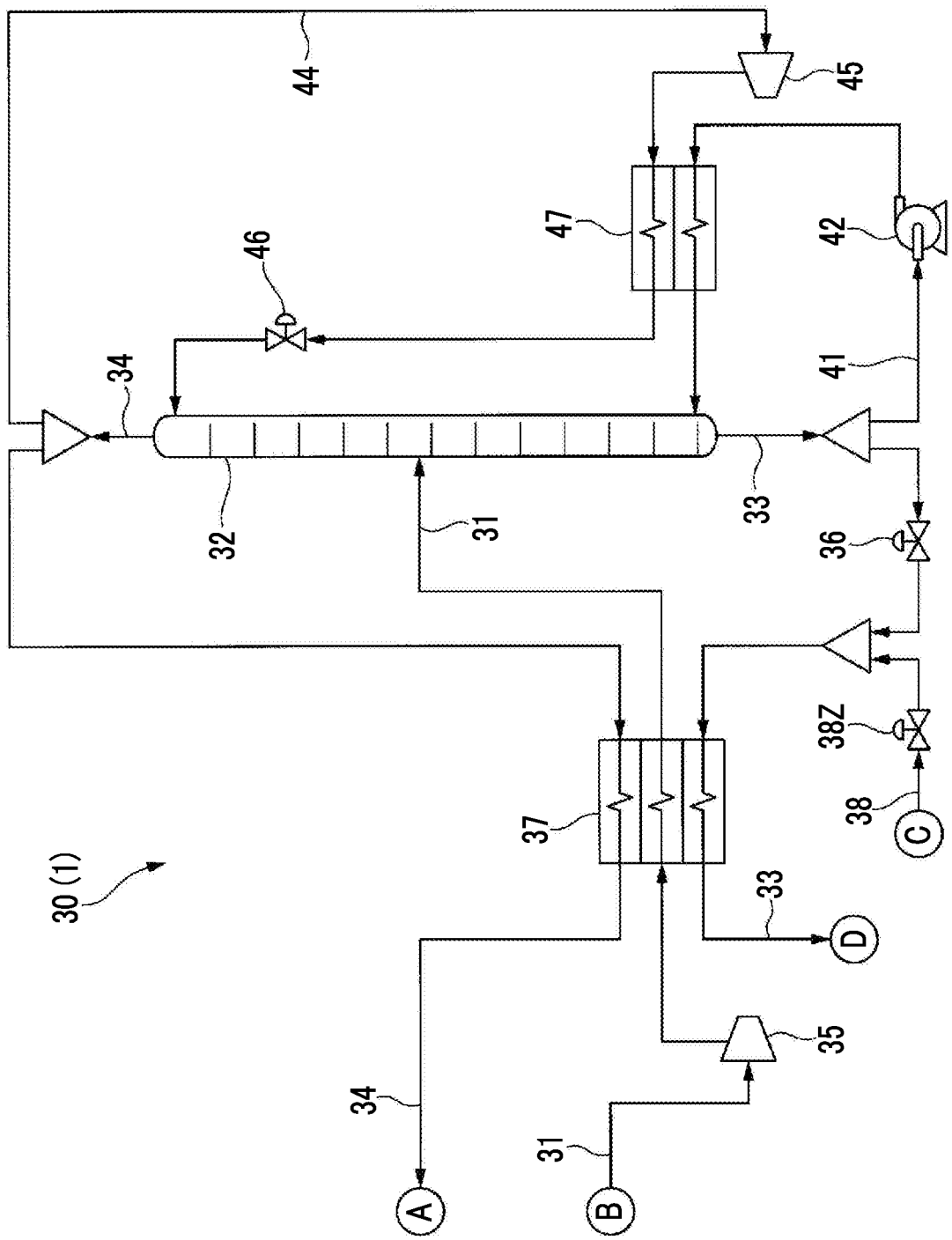
FIG. 3 is a schematic view illustrating a gas recovery system for a compressor related to the first embodiment of the invention.

As illustrated in FIGS. 1 to 3, the refrigeration cycle system 1 of the present embodiment includes the gas recovery system 30 for the compressor 3 that separates the mixed gas discharged from the secondary vent 20 of the compressor 3 into the process gas and the separation gas and recovers the separated mixed gas. The gas recovery system 30 includes a mixed gas supply line 31, a distillation column 32, a process gas recovery line 33, and a supply gas recovery line 34.

The mixed gas supply line 31 is connected to the distillation column 32 and supplies the mixed gas, which is discharged from the compressor 3, to the distillation column 32. The mixed gas supply line 31 of the present embodiment is connected to the secondary vent 20 of the aforementioned compressor 3. The mixed gas supply line 31 of the present embodiment is provided with the mixed gas compressor 35. The mixed gas compressor 35 raises the pressure of the mixed gas from the atmospheric pressure to a required pressure in the distillation column 32.

The distillation column 32 brings the separation gas in a liquid state into contact with the pressure-raised mixed gas, thereby exchanging heat between the mixed gas and the liquid separation gas to cool and liquefy the process gas contained in the mixed gas, and heat and gasify the liquid separation gas.

The distillation column 32 of the present embodiment is formed to extend in an upward-downward direction and is formed in such a tubular shape that an upper part and a lower part thereof are blocked. In FIG. 3, although the aforementioned mixed gas supply line 31 is connected to an intermediate part of the distillation column 32 in the upward-downward direction, the mixed gas supply line just has to be connected at a suitable height.

Additionally, in the distillation column 32 of the present embodiment, the liquid separation gas is supplied to an upper part of the distillation column 32, and for example, the liquid separation gas flows down from the upper part of the distillation column 32 to a lower part thereof. Accordingly, heat exchange can be efficiently performed between the mixed gas and the liquid separation gas, and the process gas contained in the mixed gas can be efficiently is cooled and liquefied. Additionally, the liquid separation gas can be efficiently heated and gasified.

A supply source of the liquid separation gas supplied to the distillation column 32 may be, for example, separately prepared, but in the present embodiment, the separation gas contained in the mixed gas is reused.

The process gas recovery line 33 is connected to the lower part of the distillation column 32 and recovers the liquid process gas discharged from the lower part of the distillation column 32. The process gas recovery line 33 of the present embodiment is connected to the principal section 2 illustrated in FIG. 1, and recovers the process gas, which is recovered from the distillation column 32, to the principal section 2.

Additionally, the process gas recovery line 33 of the present embodiment is connected to a line between the evaporator 6 and the compressor 3 of the principal section such that the process gas recovered from the distillation column 32 is again compressed in the compressor 3 of the principal section 2. For this reason, in the process gas recovery line 33 of the present embodiment, the liquid process gas recovered from the distillation column 32 is gasified using a recovery line valve 36 and a mixed gas heat exchanger 37 to be described below.

As illustrated in FIG. 3, the process gas recovery line 33 of the present embodiment is provided with the recovery line valve 36 that adjusts the amount of the liquid process gas, which is discharged from the distillation column 32 to the process gas recovery line 33, to be returned to the principal section 2. In the present embodiment, the amount of the liquid process gas returned to the principal section 2 is adjusted by adjusting the opening degree of the recovery line valve 36 such that the liquid level of the liquid process gas in the distillation column 32 is maintained within a predetermined range. Since the process gas recovery line 33 is connected to a place of the principal section 2 lower than the pressure in the distillation column 32, the recovery line valve 36 adiabatically expands the liquid process gas that flows from the distillation column 32. Accordingly, the pressure and temperature of the liquid process gas drop.

The supply gas recovery line 34 is connected to the upper part of the distillation column 32 and recovers the gaseous separation gas discharged from the upper part of the distillation column 32. The supply gas recovery line of the present embodiment is connected to the separation seal 19 of the compressor 3 illustrated in FIG. 2, and supplies the gaseous separation gas discharged from the distillation column 32 again to the separation seal 19.

Additionally, the gas recovery system 30 of the present embodiment includes the mixed gas heat exchanger 37. The mixed gas heat exchanger 37 exchanges heat between the mixed gas flowing through the mixed gas supply line 31 and the process gas flowing through the process gas recovery line 33, thereby cooling the mixed gas. Since the temperature of the mixed gas is higher than that of the process gas flowing through the process gas recovery line 33, the mixed gas is supplied to the distillation column 32 after being cooled in the mixed gas heat exchanger 37.

Particularly, in the present embodiment, the mixed gas heat exchanger 37 is disposed closer to a downstream side (a distillation column 32 side) of the mixed gas supply line 31 than the mixed gas compressor 35, and thus, the mixed gas passes through the mixed gas heat exchanger 37 in a state where the pressure of the mixed gas has been raised in the mixed gas compressor 35 and the temperature thereof has risen. Additionally, in the present embodiment, the mixed gas heat exchanger 37 is disposed closer to a downstream side (a principal section 2 side of the refrigeration cycle system 1) than the recovery line valve 36, and thus the process gas flowing through the process gas recovery line 33 passes through the mixed gas heat exchanger 37 in a state where the temperature has dropped by the adiabatic expansion in the recovery line valve 36.

As a result, the mixed gas is cooled by the process gas flowing through the process gas recovery line 33 in the mixed gas heat exchanger 37 and is supplied to the distillation column 32, for example, in a gas-liquid mixed state.

Meanwhile, the liquid process gas discharged from the distillation column 32 to the process gas recovery line 33 passes through the mixed gas heat exchanger 37 after being adiabatically expanded in the recovery line valve 36, and thus the process gas is heated and gasified by the mixed gas flowing through the mixed gas supply line 31. Accordingly, the process gas recovered from the distillation column 32 can be supplied to the compressor 3 in a gas state.

Additionally, the gas recovery system 30 of the present embodiment includes an additional supply line 38 for additionally supplying the liquid process gas to the process gas recovery line 33, between the distillation column 32 and the mixed gas heat exchanger 37. The additional supply line 38 of the present embodiment is connected between the recovery line valve 36 in the process gas recovery line 33 and the mixed gas heat exchanger 37.

By adjusting the amount of the liquid process gas additionally supplied to the process gas recovery line 33, it is possible to adjust the heat balance between the mixed gas and the process gas in the mixed gas heat exchanger 37 and to appropriately adjust such a degree that the mixed gas is cooled. In the present embodiment, the additional supply line 38 is provided with an adjustment valve 38Z. By adjusting the opening degree of the adjustment valve 38Z, the amount of the liquid process gas additionally supplied to the process gas recovery line 33 can be adjusted.

The supply source of the liquid process gas additionally supplied to the process gas recovery line 33 may be, for example, separately prepared, but is the principal section 2 of the refrigeration cycle system 1 illustrated in FIG. 1 in the present embodiment. The additional supply line 38 may be connected to the storage portion 5 of the principal section 2, for example, as illustrated in FIGS. 1 and 3. In this case, the liquid process gas stored in the storage portion 5 is supplied to the process gas recovery line 33 through the additional supply line 38.

Moreover, in the gas recovery system 30 of the present embodiment, the mixed gas heat exchanger 37 exchanges heat between the separation gas flowing through the supply gas recovery line 34 and the mixed gas flowing through the mixed gas supply line 31, thereby cooling the mixed gas.

Since the temperature of the mixed gas is higher than that of the separation gas flowing through the supply gas recovery line 34, the mixed gas is supplied to the distillation column 32 after being cooled by the separation gas flowing through the supply gas recovery line 34 in the mixed gas heat exchanger 37.

Additionally, the gas recovery system 30 of the present embodiment includes a distillation column lower circulation line (process gas circulation line) 41 that branches from the process gas recovery line 33 and returns the liquid process gas, which is discharged from the distillation column 32, to the distillation column 32 after being gasified.

The distillation column lower circulation line 41 of the present embodiment branches from the process gas recovery line 33 between the distillation column 32 and the recovery line valve 36. Additionally, the distillation column lower circulation line 41 is connected to the lower part of the distillation column 32. Additionally, the liquid process gas flowing through the distillation column lower circulation line 41 is gasified by using a circulation heat exchanger 47 (to be described below) in the present embodiment.

The distillation column lower circulation line 41 of the present embodiment is provided with a circulation pump for supplying the liquid process gas, which is discharged from the distillation column 32, to the circulation heat exchanger 47.

Additionally, the gas recovery system 30 of the present embodiment includes a distillation column upper circulation line (supply gas circulation line) 44 that branches from the supply gas recovery line 34 and returns the gaseous separation gas discharged from the distillation column 32 to the distillation column 32 after being liquefied. The distillation column upper circulation line 44 of the present embodiment branches from the supply gas recovery line 34 between the distillation column 32 and the mixed gas heat exchanger 37. Additionally, the distillation column upper circulation line 44 is connected to the upper part of the distillation column 32.

In the distillation column upper circulation line 44 of the present embodiment, the gaseous separation gas recovered from the distillation column 32 is liquefied and returned to the upper part of the distillation column 32 by using a circulation compressor 45, the circulation heat exchanger 47, and a circulation valve 46 to be described below.

The distillation column upper circulation line 44 of the present embodiment is provided with the circulation compressor 45. The circulation compressor 45 returns the separation gas discharged from the distillation column 32 to the distillation column 32 after being drawn into the distillation column upper circulation line 44 from the supply gas recovery line 34. Additionally, the circulation compressor 45 raises the pressure of the separation gas.

Additionally, the circulation valve 46 is provided between the circulation compressor 45 in the distillation column upper circulation lines 44 of the present embodiment and the distillation column 32. The circulation valve 46 adjusts the discharge pressure of the circulation compressor 45 by adjusting the opening degree thereof, and adiabatically expands the separation gas flowing through the distillation column upper circulation line 44. Accordingly, the pressure and temperature of the separation gas raised in pressure and temperature by the circulation compressor 45 drop.

A recovery valve that adjusts the amount of the gaseous separation gas, which is discharged from the distillation column 32 to the supply gas recovery line 34, to be returned to the separation seal 19 may be provided between a connected portion to the distillation column upper circulation line 44 of the supply gas recovery line 34, and the mixed gas heat exchanger 37, like the recovery line valve 36 provided in the process gas recovery line 33. The opening degree of the recovery valve may be adjusted such that the pressure of the gas in the distillation column 32 is maintained within a predetermined range, so that the amount of the gaseous separation gas returned to the separation seal 19 can be adjusted.

Additionally, the gas recovery system 30 of the present embodiment includes the circulation heat exchanger 47. The circulation heat exchanger 47 exchanges heat between the liquid process gas flowing through the distillation column lower circulation line 41 and the gaseous separation gas flowing through the distillation column upper circulation line 44.

In the present embodiment, the separation gas passes through the circulation heat exchanger 47 in a state where the separation gas is compressed in the circulation compressor 45, that is, in a state the temperature of the separation gas has risen, and thus the temperature of the separation gas becomes higher than that of the process gas.

For this reason, in the circulation heat exchanger 47, the liquid process gas flowing through the distillation column lower circulation line 41 is heated by the gaseous separation gas flowing through the distillation column upper circulation line 44. Accordingly, the liquid process gas flowing through the distillation column lower circulation line 41 is gasified, and the gaseous process gas returns to the lower part of the distillation column 32.

Additionally, in the circulation heat exchanger 47, the gaseous separation gas flowing through the distillation column upper circulation line 44 is cooled by the liquid process gas flowing through the distillation column lower circulation line 41. Moreover, since the separation gas after being passed through the circulation heat exchanger 47 is adiabatically expanded by passing through the circulation valve 46, the liquefaction of the separation gas is promoted. Accordingly, the separation gas of which at least a portion has been turned into a liquid state returns from the distillation column upper circulation line 44 to the upper part of the distillation column 32. The liquid separation gas that has returned from the distillation column upper circulation line 44 to the upper part of the distillation column 32 is brought into contact with the mixed gas in the distillation column as mentioned above, thereby exchanging heat with the mixed gas.

The gas recovery system 30 of the present embodiment configured as described above constitutes a compressor system together with the compressor 3 of the principal section 2.

Next, the operation of the gas recovery system 30 of the above configuration will be described.

A gaseous mixed gas discharged from the secondary vent 20 of the compressor 3 illustrated in FIGS. 1 and 2 flows through the mixed gas supply line 31 and is raised in pressure by the mixed gas compressor 35. In this case, the temperature of the mixed gas also rises. The mixed gas of which pressure and temperature are raised in the mixed gas compressor 35 is cooled by the process gas flowing through the process gas recovery line 33 and the separation gas flowing through the supply gas recovery line 34 by passing through the mixed gas heat exchanger 37, and thus the mixed gas is supplied to the distillation column 32, for example, in a gas-liquid mixed state.

The mixed gas supplied to the distillation column 32 is brought into contact with the liquid separation gas, thereby exchanging heat with the liquid separation gas. Accordingly, the process gas contained in the mixed gas is cooled and liquefied by the liquid separation gas. Meanwhile, the separation gas contained in the mixed gas in the distillation column 32 is maintained in a gas state. Additionally, the liquid separation gas is heated and gasified by the process gas contained in the mixed gas.

The process gas (liquid process gas) liquefied in the distillation column 32 is discharged from the lower part of the distillation column 32 to the process gas recovery line 33. Additionally, the gaseous separation gas is discharged from the upper part of the distillation column 32 to the supply gas recovery line 34.

At least a portion of the liquid process gas discharged to the process gas recovery line 33 is drawn into the distillation column lower circulation line 41 by the circulation pump 42. The liquid process gas flowing through the distillation column lower circulation line 41 passes through the circulation heat exchanger 47, and thus the process gas is heated and gasified by the separation gas flowing through the distillation column upper circulation line 44. Accordingly, the process gas flowing through the distillation column lower circulation line 41 returns to the lower part of the distillation column 32 in a gas state.

The gaseous process gas that has returned from the distillation column lower circulation line 41 to the distillation column 32 is again cooled and liquefied by the liquid separation gas, and is discharged from the lower part of the distillation column 32 in a liquid state. Additionally, in a case where the gaseous separation gas is contained in the gaseous process gas that has returned from the distillation column lower circulation line 41 to the distillation column 32, this gaseous separation gas ascends to the upper part of the distillation column 32, and is discharged from the upper part of the distillation column 32 to the supply gas recovery line 34. Accordingly, the purity of the process gas in the lower part of the distillation column 32 increases.

Additionally, at least a portion of the gaseous separation gas discharged from the upper part of the distillation column 32 to the supply gas recovery line 34 is drawn into the distillation column upper circulation line 44 by the circulation compressor 45. The gaseous separation gas drawn into the distillation column upper circulation line 44 is raised in pressure in the circulation compressor 45, and subsequently, passes through the circulation heat exchanger 47, and thus the separation gas is cooled by the process gas flowing through the distillation column lower circulation line 41. Thereafter, since the separation gas flowing through the distillation column upper circulation line 44 is cooled by being adiabatically expanded in the circulation valve 46, the liquefaction of the separation gas is promoted. The separation gas after being passed through the circulation valve 46 returns to the upper part of the distillation column 32.

The liquid separation gas in the separation gas that has returned from the distillation column upper circulation line 44 to the distillation column 32 is again heated and gasified by the process gas contained in the mixed gas and the gaseous process gas that has returned from the distillation column lower circulation line 41 to the distillation column 32, and is discharged from the upper part of the distillation column 32.

Additionally, the gaseous separation gas in the separation gas that has returned from the distillation column upper circulation line 44 to the distillation column 32, is discharged from the upper part of the distillation column 32 as it is. Additionally, in a case where the process gas is contained in the separation gas that has returned from the distillation column upper circulation line 44 to the distillation column 32, this process gas is liquefied and is discharged from the lower part of the distillation column 32. Accordingly, the purity of the separation gas in the upper part of the distillation column 32 increases.

The liquid process gas, which is discharged from the lower part of the distillation column 32 to the process gas recovery line 33 and flows through the process gas recovery line 33 without being drawn into the distillation column lower circulation line 41, is adiabatically expanded in the recovery line valve 36, and thus the temperature thereof drops further. Next, the liquid process gas flowing through the process gas recovery line passes through the mixed gas heat exchanger 37, and thus the process gas is heated and gasified by the mixed gas flowing through the mixed gas supply line 31. The gasified gaseous process gas is again supplied to the compressor 3 of the principal section 2.

The gaseous separation gas, which is discharged from the upper part of the distillation column 32 to the supply gas recovery line 34 and flows through the supply gas recovery line 34 without being drawn into the distillation column upper circulation line 44, passes through the mixed gas heat exchanger 37, and thus the separation gas is heated by the mixed gas flowing through the mixed gas supply line 31. Thereafter, the heated gaseous separations gas is supplied to the separation seal 19.

As described above, according to the gas recovery system 30, the compressor system including the same and the refrigeration cycle system 1 in the present embodiment, the mixed gas discharged from the compressor 3 is separated into the process gas and the separation gas in the distillation column 32, and the process gas discharged from the distillation column 32 is returned to the compressor 3. Hence, the amount of the process gas additionally supplied to the compressor 3 can be reduced. Additionally, since the separation gas discharged from the distillation column 32 is also returned to the separation seal 19 of the compressor 3, the amount of the separation gas supplied from the external supply source to the compressor 3 can be reduced.

From the above, the running cost of the compressor 3 and the refrigeration cycle system 1 equipped with the compressor can be reduced. Particularly, in the present embodiment, since expensive Freon is used as the process gas, the running cost of the compressor 3 and the refrigeration cycle system 1 can be effectively reduced.

Additionally, the gas recovery system 30 of the present embodiment includes the distillation column lower circulation line 41 that branches from the process gas recovery line 33 and returns the process gas, which is discharged from the lower part of the distillation column 32, to the distillation column 32 after being gasified. For this reason, it is possible to effectively reduce the amount of the separation gas contained in the liquid process gas discharged from the distillation column 32 and to recover the process gas with high purity.

Additionally, the gas recovery system 30 of the present embodiment includes the distillation column upper circulation line 44 that branches from the supply gas recovery line 34 and returns the separation gas, which is discharged from the upper part of the distillation column 32, to the distillation column 32 after being liquefied. For this reason, it is possible to effectively reduce the amount of the process gas contained in the gaseous separation gas discharged from the distillation column 32 and to recover the separation gas with high purity.

Additionally, since the separation gas separated from the mixed gas can be used as the liquid separation gas that exchanges heat with the mixed gas in the distillation column 32, the running cost of the gas recovery system 30 can also be reduced.

Additionally, the gas recovery system 30 of the present embodiment includes the circulation heat exchanger that exchanges heat between the process gas flowing through the distillation column lower circulation line 41 and the separation gas flowing through the distillation column upper circulation line 44. For this reason, in the circulation heat exchanger 47, the liquid process gas flowing through the distillation column lower circulation line 41 can be heated by the gaseous separation gas flowing through the distillation column upper circulation line 44, so that the gasification of the process gas in the distillation column lower circulation line 41 can be promoted. Additionally, in the circulation heat exchanger 47, the gaseous separation gas flowing through the distillation column upper circulation line 44 can be cooled by the liquid process gas flowing through the distillation column lower circulation line 41, so that the liquefaction of the separation gas in the distillation column upper circulation line 44 can be promoted.

Additionally, the heating of the process gas flowing through the distillation column lower circulation line 41 and the cooling of the separation gas flowing through the distillation column upper circulation line 44 are performed by the heat exchange between the process gas and the separation gas. That is, since the heating of the process gas and the cooling of the separation gas can be performed without using a separate heat source, the running cost of the gas recovery system 30 can be reduced.

Moreover, the gas recovery system 30 of the present embodiment includes the mixed gas heat exchanger 37 that exchanges heat between the process gas flowing through the process gas recovery line 33 and the mixed gas flowing through the mixed gas supply line 31. Accordingly, since at least a portion of the mixed gas can be liquefied by cooling the mixed gas in the mixed gas heat exchanger 37, the mixed gas at least in a gas-liquid mixed state can be supplied to the distillation column 32. Hence, in the distillation column 32, the mixed gas can be efficiently separated into the process gas and the separation gas.

Additionally, since the mixed gas is cooled using the process gas flowing through the process gas recovery line 33 (that is, since the mixed gas is not cooled by a separate cooling source), the running cost of the gas recovery system 30 can be reduced.

Additionally, according to the gas recovery system 30 of the present embodiment, the liquid process gas is additionally supplied to the process gas recovery line 33 on the upstream side of the mixed gas heat exchanger 37. For this reason, in the mixed gas heat exchanger 37, it is possible to adjust the heat balance between the mixed gas flowing through the mixed gas supply line 31 and the process gas flowing through the process gas recovery line 33 and to appropriately adjust such a degree that the mixed gas is cooled.

Moreover, in the gas recovery system 30 of the present embodiment, the separation gas flowing through the supply gas recovery line 34 also contributes to the cooling of the mixed gas flowing through the mixed gas supply line 31 in the mixed gas heat exchanger 37. For this reason, it is possible to reduce the amount of the liquid process gas additionally supplied to the process gas recovery line 33.

Additionally, in the refrigeration cycle system 1 of the present embodiment, the carbon dioxide that is a kind of inert gas is used as the separation gas treated in the compressor 3. Therefore, the mixed gas is suitably separable into liquid Freon and gaseous carbon dioxide in the distillation column 32.

Figure 4:
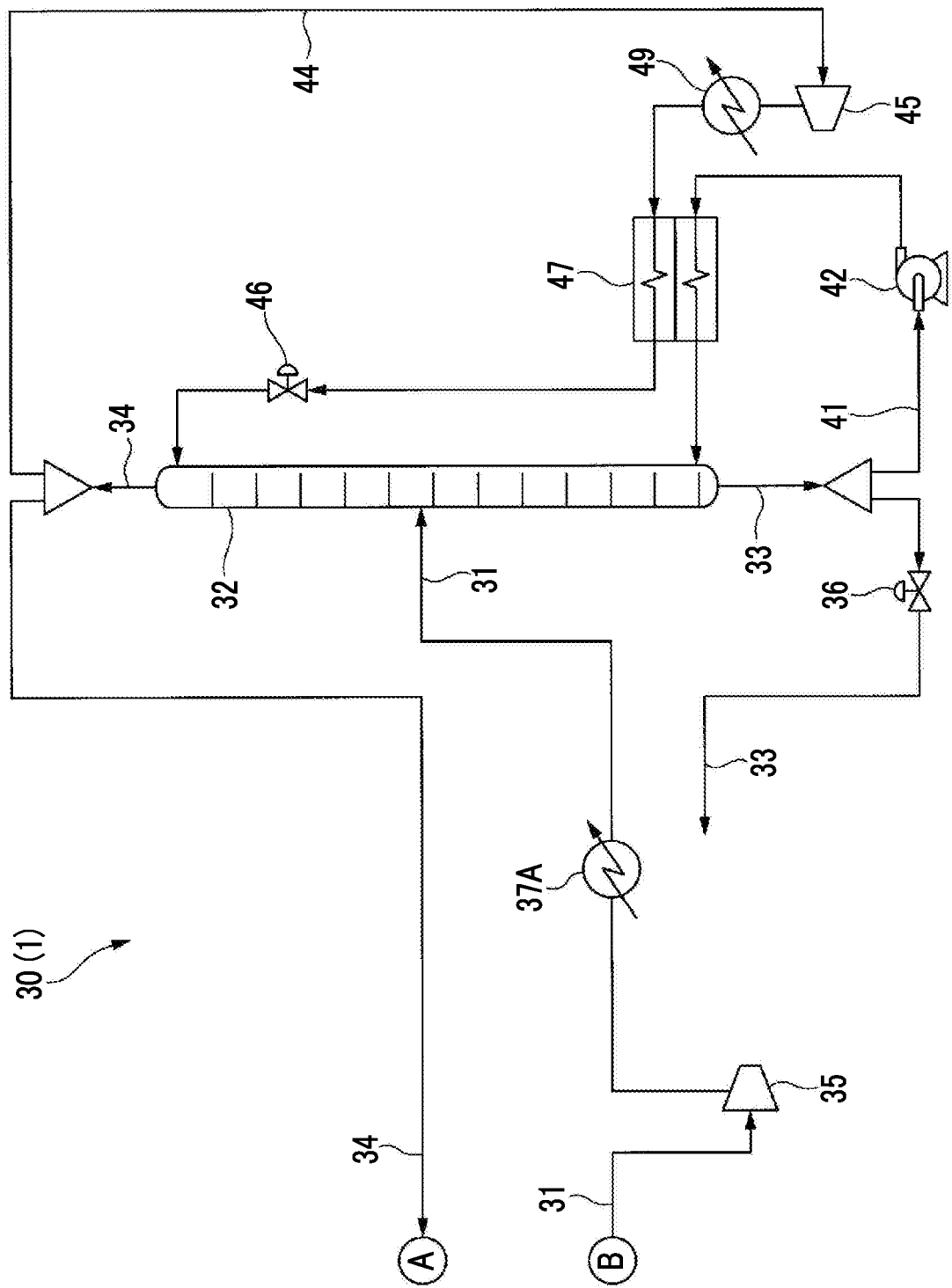
FIG. 4 is a schematic view illustrating a modification example of the gas recovery system for a compressor of the first embodiment.

The gas recovery system 30 of the above first embodiment may include a separate cooling source 37A that cools the mixed gas flowing through the mixed gas supply line 31, for example, as illustrated in FIG. 4, instead of including the mixed gas heat exchanger 37.

Additionally, although the gas recovery system 30 of the first embodiment may include, for example, a separate heating source that heats the process gas flowing through the process gas recovery line 33 or the separation gas flowing through the supply gas recovery line 34, the gas recovery system 30 may not include the heating source, for example, as illustrated in FIG. 4. In this case, the process gas that flows through the process gas recovery line 33 towards the principal section 2 is in a liquid state. For this reason, the process gas recovery line 33 may be connected to a line between the condenser 4 and the storage portion 5 in the principal section 2 such that the liquid process gas is returned to the principal section 2.

Additionally, in the circulation heat exchanger 47, in a case where a degree such that the gaseous separation gas flowing through the distillation column upper circulation line 44 is cooled by the liquid process gas flowing through the distillation column lower circulation line 41 is insufficient, specifically, in a case where the gaseous separation gas flowing through the distillation column upper circulation line 44 is insufficiently cooled and is not liquefied even if the separation gas passes through the circulation heat exchanger 47 and the circulation valve 46, for example, as illustrated in FIG. 4, the gaseous separation gas may be cooled by the cooling source 49 after having passed through the circulation compressor 45.

Additionally, for example, the circulation pump 42 may not be provided in the distillation column lower circulation line 41. For example, the liquid process gas discharged from the distillation column 32 to the distillation column lower circulation line 41 may be supplied to the circulation heat exchanger 47 by a liquid head difference in the distillation column 32.

Additionally, the gas recovery system 30 of the above first embodiment may include, for example, a separate heating source that heats the liquid process gas flowing through the distillation column lower circulation line 41 and a separate cooling source that cools the gaseous separation gas flowing through the distillation column upper circulation line 44, instead of including the circulation heat exchanger 47.

Second Embodiment

Next, a second embodiment will be described with reference to FIG. 5.

In the second embodiment, the same constituent elements as those of the first embodiment will be designated by the same reference signs, and the detailed description thereof will be omitted.

Figure 5:
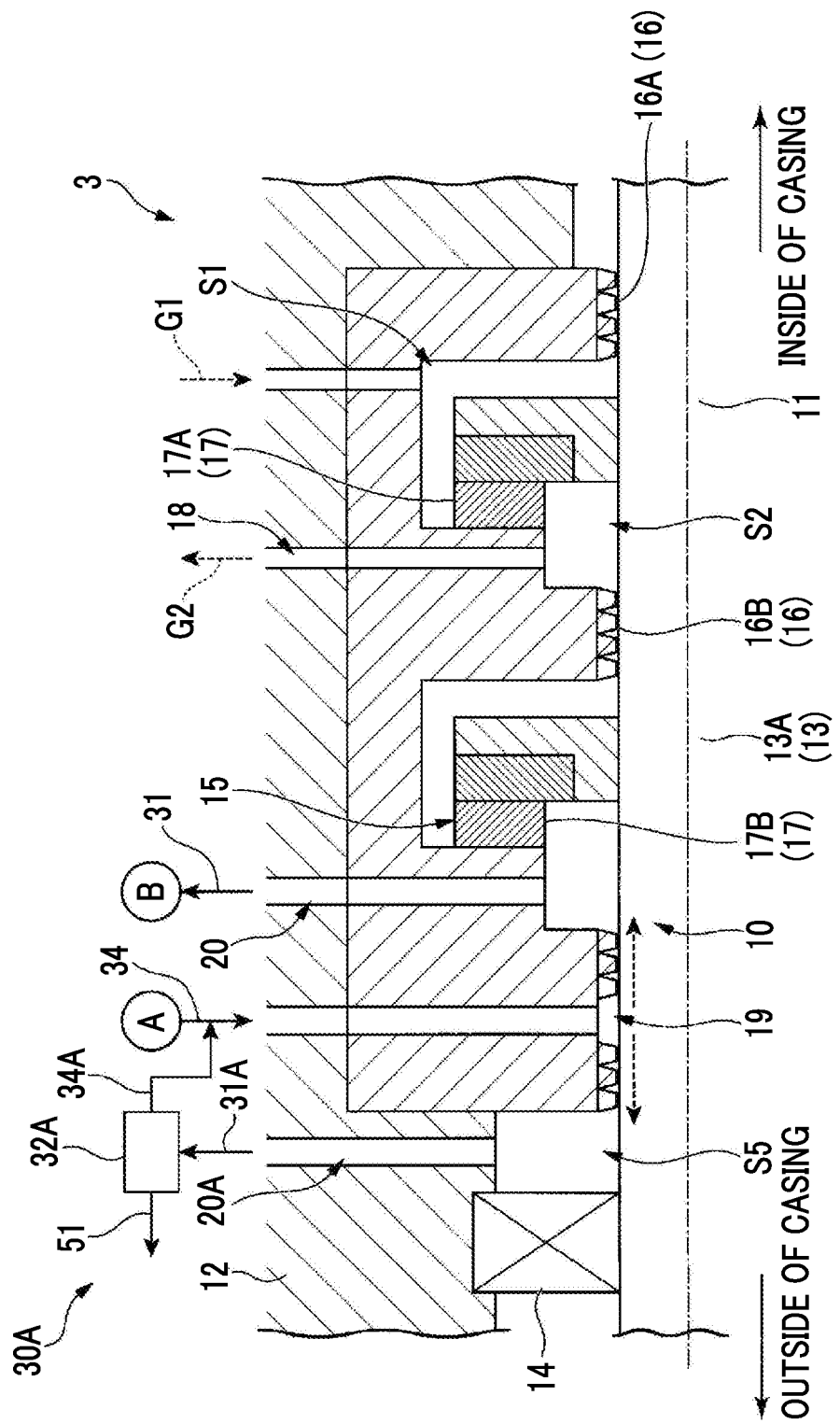
FIG. 5 is a view illustrating a gas recovery system for a compressor and main parts of the compressor related to a second embodiment of the invention.

As illustrated in FIG. 5, in a gas recovery system 30A related to the second embodiment of the invention, the separation gas is separated and recovered from a second mixed gas in which the separation gas (supply gas) from the separation seal 19 and the lubricating oil from the bearing 14 of the compressor 3 are mixed together. Hereinafter, this will be specifically described.

The second mixed gas is generated in a space S5 (hereinafter a second mixing space S5) between the separation seal 19 and the bearing 14 in the gap between the stator 12 and the rotor 11. A bearing vent 20A for discharging the second mixed gas to the gas recovery system 30A is connected to the second mixing space S5.

The gas recovery system 30A illustrated in FIG. 5 includes a second mixed gas supply line 31A, a second distillation column 32A, and a second supply gas recovery line 34A, in addition to the same configuration as the first embodiment.

The second mixed gas supply line 31A is connected to the bearing vent 20A of the compressor 3 and the second distillation column 32A and supplies the second mixed gas, which is discharged from the compressor 3, to the second distillation column 32A, like the mixed gas supply line 31 of the first embodiment.

The second distillation column 32A brings the liquid separation gas into contact with the second mixed gas, thereby exchanging heat between the second mixed gas and the liquid separation gas to cool and liquefy the lubricating oil contained in the second mixed gas, and heat and gasify the liquid separation gas.

Although the second distillation column 32A is simplified and described in FIG. 5, the second distillation column 32A is configured similarly to the distillation column 32 of the first embodiment. For example, the liquefied lubricating oil is discharged from a lower part of the second distillation column 32A to a lubricating oil recovery line 51. Additionally, the gaseous separation gas contained in the gasified separation gas and the second mixed gas is discharged from an upper part of the second distillation column 32A to the second supply gas recovery line 34A.

The gaseous separation gas discharged to the second supply gas recovery line 34A is again supplied to the separation seal 19. In FIG. 5, the second supply gas recovery line 34A is connected to the supply gas recovery line 34 but may be directly connected to, for example, the separation seal 19. Although not illustrated in FIG. 5, a configuration in which the liquid separation gas is supplied to the second distillation column 32A may be the same distillation column upper circulation line 44 or the like as that of the first embodiment.

According to the above-mentioned second embodiment, the same effects as those of the first embodiment are exhibited.

That is, the second mixed gas in which the separation gas and the lubricating oil are mixed together in the compressor 3 can be separated into the separation gas and the lubricating oil in the second distillation column 32A, and the separated separation gas can be reused as the gas supplied to the separation seal 19 of the compressor 3. Hence, the amount of the separation gas supplied from an external supply source to the compressor can be further reduced.

Third Embodiment

Next, a third embodiment will be described mainly with reference to FIG. 6.

In the third embodiment, the same constituent elements as those of the first embodiment will be designated by the same reference signs, and the detailed description thereof will be omitted.

Figure 6:
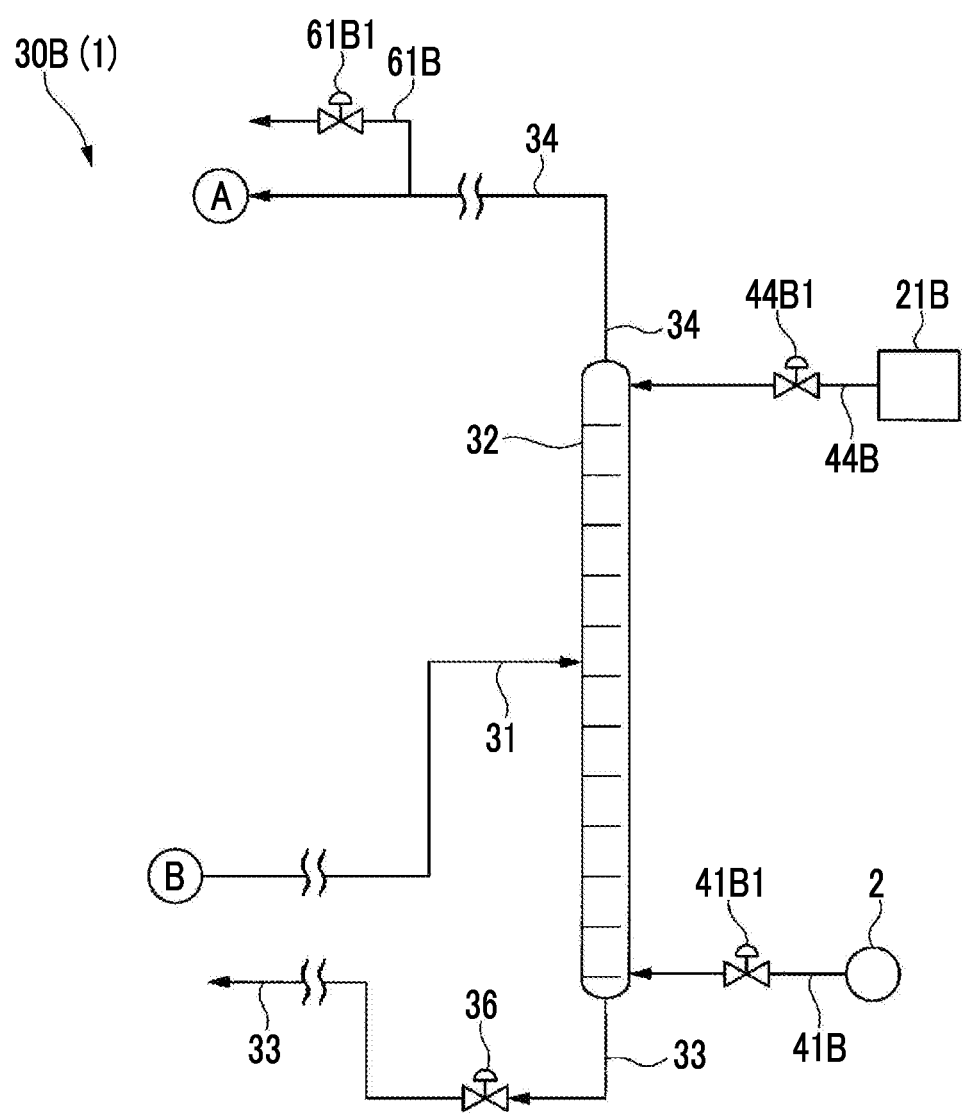
FIG. 6 is a schematic view illustrating a gas recovery system for a compressor related to a third embodiment of the invention.

As illustrated in FIG. 6, in a gas recovery system 30B related to the third embodiment of the invention, as in the first embodiment, the mixed gas in which the process gas and the separation gas (supply gas) supplied to the separation seal 19 (refer to FIG. 2) of the seal portion 10 of the compressor 3 are mixed together is separated into the process gas and the separation gas and recovered the separated gas. This will be specifically described below.

The gas recovery system 30B of the present embodiment includes the same mixed gas supply line 31, distillation column 32, process gas recovery line 33, and supply gas recovery line 34 as those of the first embodiment. In FIG. 6, although description of respective halfway parts of the mixed gas supply line 31, the process gas recovery line 33, and the supply gas recovery line 34 are omitted, the respective halfway parts may be configured similarly to the aforementioned first embodiment (for example, FIG. 3), its modification example (for example, FIG. 4), and the like.

The gas recovery system 30B of the present embodiment does not include the distillation column lower circulation line 41 (refer to FIG. 3) of the first embodiment but includes a distillation column lower supply line (process gas supply line) 41B. The distillation column lower supply line 41B supplies the gaseous process gas, which is treated in the compressor 3 (refer to FIG. 1) of the principal section 2, to the distillation column 32.

The gaseous process gas supplied to the distillation column 32 may be, for example, a gaseous process gas before being taken into the compressor 3 or may be, for example, a gaseous process gas after being compressed in the compressor 3. That is, in the principal section 2 of the refrigeration cycle system 1, the distillation column lower supply line 41B may be connected to, for example, a line that connects the compressor 3 and the condenser 4 together, or may be connected to, for example, a line that connects the evaporator 6 and the compressor 3 together (refer to FIG. 1).

The distillation column lower supply line 41B of the present embodiment is provided with an adjustment valve 41B1. By adjusting the opening degree of the adjustment valve 41B1, the amount of the gaseous process gas supplied to the distillation column 32 can be adjusted.

Additionally, the gas recovery system 30B of the present embodiment does not include the distillation column upper circulation line 44 (refer to FIG. 3) of the first embodiment but includes a distillation column upper supply line (external supply line) 44B. The distillation column upper supply line 44B supplies the liquid separation gas to the distillation column 32. The liquid separation gas supplied to the distillation column 32 just has to be supplied from, for example, an external supply source 21B illustrated in FIG. 6. Specific examples of the external supply source 21B include, for example, a storage portion that stores the separation gas in a liquid state, other facilities that treat separation gas, and the like.

The distillation column upper supply line 44B of the present embodiment is provided with an adjustment valve 44B1. By adjusting the opening degree of the adjustment valve 44B1, the amount of the liquid separation gas supplied to the distillation column 32 can be adjusted.

Additionally, the gas recovery system 30B of the present embodiment includes a supply gas discharge line 61B that branches from the supply gas recovery line 34 and discharges a portion of the separation gas from the supply gas recovery line 34. The separation gas discharged to the supply gas discharge line 61B may be, for example, simply discharged to the outside or may be, for example, used as a gas for other facilities or gas for other plants. That is, the supply gas discharge line 61B may be, for example, open to the atmosphere, or may be, for example, connected to other facilities or plants.

Additionally, the supply gas discharge line 61B of the present embodiment is provided with a discharge valve 61B1. The opening degree of the discharge valve 61B1 may be adjusted, for example, such that the pressure in the supply gas recovery line 34 is maintained within a predetermined range.

According to the above-mentioned third embodiment, the same effects as those of the first embodiment are exhibited.

That is, according to the gas recovery system 30B of the third embodiment, the distillation column lower supply line 41B is included instead of the distillation column lower circulation line 41 of the first embodiment, so that the purity of the liquid process gas discharged from the distillation column 32 can be enhanced. That is, the process gas with high purity can be recovered from the mixed gas.

Additionally, the distillation column lower supply line 41B of the present embodiment is provided instead of the distillation column lower circulation line 41 of the first embodiment. For this reason, it is not necessary to provide the gas recovery system 30B of the present embodiment with a heating source (for example, the circulation heat exchanger 47 in FIG. 3, or the like) that heats the process gas flowing through the distillation column lower circulation line 41 like the first embodiment. Hence, the gas recovery system 30B can be simply configured, and additionally, the manufacturing cost of the gas recovery system 30B can be reduced.

Additionally, according to the gas recovery system 30B of the third embodiment, the distillation column upper supply line 44B is included instead of the distillation column upper circulation line 44 of the first embodiment, so that the purity of the gaseous separation gas discharged from the distillation column 32 can be enhanced. That is, it is possible to recover the separation gas with high purity from the mixed gas.

Additionally, the distillation column upper supply line 44B of the present embodiment is provided instead of the distillation column upper circulation line 44 of the first embodiment. For this reason, it is not necessary to provide the gas recovery system 30B of the present embodiment with a cooling source (for example, the circulation heat exchanger 47 in FIG. 3, the cooling source 49 in FIG. 4, or the like) that cools the separation gas flowing through the distillation column upper circulation line 44 like the first embodiment. Hence, the gas recovery system 30B can be simply configured, and additionally, the manufacturing cost of the gas recovery system 30B can be reduced.

Additionally, according to the gas recovery system 30B of the present embodiment, a portion of the separation gas flowing through the supply gas recovery line 34 can be discharged to the supply gas discharge line 61B. For this reason, even if the separation gas is supplied to the distillation column 32 through the distillation column upper supply line 44B, the amount of the separation gas supplied to the separation seal 19 (refer to FIG. 2) can be prevented from becoming excessive.

The configuration of the above-mentioned third embodiment may be appropriately combined with the configuration of the aforementioned first embodiment or the configuration of the aforementioned second embodiment.

That is, the gas recovery system of the invention may include, for example, the distillation column lower circulation line 41 and the distillation column upper supply line 44B, or may include, for example, the distillation column lower supply line 41B and the distillation column upper circulation line 44.

Additionally, the gas recovery system 30B of the third embodiment may be applied to, for example, the gas recovery system 30A of the second embodiment.

Fourth Embodiment

Next, a fourth embodiment will be described mainly with reference to FIG. 7.

In the fourth embodiment, the same constituent elements as those of the first embodiment will be designated by the same reference signs, and the detailed description thereof will be omitted. In the fourth embodiment, the site of the seal portion 10 of the compressor 3 that supplies the supply gas treated in the gas recovery system is different from that of the first embodiment.

As illustrated in FIG. 7, the seal portion 10 related to the fourth embodiment of the invention includes the same leakage preventing seal portion 15 as that of the first embodiment. Additionally, the leakage preventing seal portion 15 includes a plurality of dry gas seals 17 arrayed in order from the inside of the casing to the outside thereof in the axial direction of the rotary shaft 13, as in the first embodiment. The plurality of dry gas seals 17 in the present embodiment are the same first dry gas seal 17A and second dry gas seal 17B as those of the first embodiment.

Between the two dry gas seals 17A and 17B, for example, no other seals may be provided. However, in the present embodiment, the same second labyrinth seal 16B as that of the first embodiment is provided. For this reason, the second space S2 is formed between the first dry gas seal 17A and the second labyrinth seal 16B, and a third space S3 is formed between the second labyrinth seal 16B and the second dry gas seal 17B. The second labyrinth seal 16B may be, for example, a barrier seal.

In the present embodiment, the supply gas treated in the same gas recovery system 30 as that of the first embodiment is not the separation gas illustrated in the first to third embodiments and is a seal gas supplied between the first dry gas seal 17A and the second dry gas seal 17B. In the present embodiment, a seal gas is supplied to the third space S3 between the second labyrinth seal 16B and the second dry gas seal 17B. Accordingly, the pressure of the third space S3 rises, and the process gas that has leaked from the first space S1 through the first dry gas seal 17A to the second space S2 is prevented from leaking through the second labyrinth seal 16B to the third space S3.

The seal gas supplied between the first dry gas seal 17A and the second dry gas seal 17B includes at least the seal gas recovered in the same gas recovery system 30 (refer to FIG. 3) as that of the first embodiment. For this reason, the same supply gas recovery line 34 as that of the first embodiment is connected between the first dry gas seal 17A and the second dry gas seal 17B. In the present embodiment, the supply gas recovery line 34 is connected to the third space S3.

Additionally, the seal gas supplied between the first dry gas seal 17A and the second dry gas seal 17B may also include, for example, the seal gas from the external supply source 21 illustrated in FIG. 1, in addition to the seal gas from the gas recovery system 30.

As in the first embodiment, the process gas in the present embodiment may be, for example, Freon or may be, for example, hydrocarbon.

Meanwhile, the above-mentioned seal gas may be, for example, gas of which the boiling point is lower than that of the process gas, similar to the separation gas in the first embodiment. The seal gas in the present embodiment may be, for example, carbon dioxide or may be, for example, hydrocarbon.

In the aforementioned second space S2 (hereinafter referred to as a mixing space S2), the process gas that has leaked from the first dry gas seal 17A and the supplied seal gas are mixed together. A primary vent 18C for discharging the mixed gas, in which the process gas and the seal gas are mixed together, from the mixing space S2 to the same gas recovery system 30 as that of the first embodiment is connected to the mixing space S2. That is, the primary vent 18C is connected to the mixed gas supply line 31.

Additionally, the seal portion 10 of the present embodiment includes the same separation seal 19 as that of the first embodiment. In the present embodiment, the separation gas is supplied only from an external supply source 71 to the separation seal 19. The separation gas just has to be at least inert gas. Although the separation gas may be, for example, carbon dioxide, the separation gas is nitrogen more inexpensive than the carbon dioxide in the present embodiment.

In the present embodiment, the seal gas (supply gas) that has leaked from the leakage preventing seal portion 15, and the separation gas from the separation seal 19 are mixed together in the mixing space S4 between the leakage preventing seal portion 15 and the separation seal 19.

A secondary vent 20C for discharging a mixed gas G4, in which the seal gas and the separation gas are mixed together, from the mixing space S4 to the outside (for example, opening to the atmosphere) is connected to the mixing space S4 of the present embodiment.

According to the above-mentioned fourth embodiment, the same effects as those of the first embodiment are exhibited.

That is, even if the seal gas supplied between the adjacent dry gas seals 17A and 17B is mixed with the process gas, the seal gas and the process gas can be separated from each other and can be recovered respectively. Additionally, the recovered gaseous seal gas can be reused as the gas supplied between the dry gas seals 17A and 17B of the compressor 3. Hence, the amount of the seal gas supplied from the external supply source to the compressor 3 can be reduced.

Additionally, according to the fourth embodiment, the seal gas is supplied between the adjacent dry gas seals 17A and 17B, and the separation gas is supplied between the second dry gas seal 17B and the bearing 14. For this reason, even if the seal gas is hydrocarbon, the hydrocarbon can be prevented from reaching the bearing 14 located outside the seal portion 10. Accordingly, mixing of the hydrocarbon, which is a combustible gas, into a lubricating oil supply system can be prevented.

The configuration of the above-mentioned fourth embodiment is not limited to being applied to the gas recovery system 30 of the first embodiment and can be applied to, for example, the gas recovery system 30B of the third embodiment.

For example, in the gas recovery system 30B of the third embodiment to which the configuration of the fourth embodiment is applied, in a case where the liquid seal gas (supply gas) supplied from the external supply source 21B through the distillation column upper supply line 44B to the distillation column 32 is hydrocarbon, the external supply source 21B may be, for example, a liquefied natural gas (LNG) plant that purifies LNG. That is, the liquid seal gas (hydrocarbon) supplied to the distillation column 32 may be, for example, LNG purified in the LNG plant.

Since the refrigeration cycle system 1 illustrated in FIG. 1 is also provided in the LNG plant, the purified LNG can be effectively used as the liquid seal gas supplied to the distillation column 32.

Additionally, in the gas recovery system 30B of the third embodiment to which the configuration of the fourth embodiment is applied, in a case where the gaseous seal gas discharged from the distillation column 32 to the supply gas discharge line 61B is hydrocarbon, the seal gas (hydrocarbon) discharged to the supply gas discharge line 61B may be incinerated and disposed as, for example, gas flare, or may be used as, for example, fuel gas.

Although the invention has been described above in detail, the invention is not limited to the above-described embodiments, and various changes can be added without departing from the scope of the invention.

Additionally, the gas recovery system of the invention is not limited to being provided in the refrigeration cycle system 1 of the above embodiment and can be provided for at least a compressor that discharges a mixed gas.

REFERENCE SIGNS LIST

1: REFRIGERATION CYCLE SYSTEM
2: PRINCIPAL SECTION

3: COMPRESSOR
4: CONDENSER
5: STORAGE PORTION
6: EVAPORATOR
7: DRIVING MACHINE
10: SEAL PORTION
11: ROTOR
12: STATOR
13: ROTARY SHAFT
14: BEARING
15: LEAKAGE PREVENTING SEAL PORTION
17, 17A, 17B: DRY GAS SEAL
18, 18C: PRIMARY VENT
19: SEPARATION SEAL
20, 20C: SECONDARY VENT
20A: BEARING VENT
30, 30A, 30B: GAS RECOVERY SYSTEM
31: MIXED GAS SUPPLY LINE
31A: SECOND MIXED GAS SUPPLY LINE
32: DISTILLATION COLUMN
32A: SECOND DISTILLATION COLUMN
33: PROCESS GAS RECOVERY LINE
34: SUPPLY GAS RECOVERY LINE
34A: SECOND SUPPLY GAS RECOVERY LINE
35: MIXED GAS COMPRESSOR
36: RECOVERY LINE VALVE
37: MIXED GAS HEAT EXCHANGER
38: ADDITIONAL SUPPLY LINE
41: DISTILLATION COLUMN LOWER CIRCULATION LINE (PROCESS GAS CIRCULATION LINE)
41B: DISTILLATION COLUMN LOWER SUPPLY LINE (PROCESS GAS SUPPLY LINE)
42: CIRCULATION PUMP
44: DISTILLATION COLUMN UPPER CIRCULATION LINE (SUPPLY GAS CIRCULATION LINE)
44B: DISTILLATION COLUMN UPPER SUPPLY LINE (EXTERNAL SUPPLY LINE)
45: CIRCULATION COMPRESSOR
46: CIRCULATION VALVE
47: CIRCULATION HEAT EXCHANGER
61B: SUPPLY GAS DISCHARGE LINE
S2: SECOND SPACE (MIXING SPACE)
S4: MIXING SPACE

The invention claimed is:

1. A refrigeration cycle system comprising:
a compressor which compresses refrigerant process gas in a gas state;
a seal portion which is provided in each of gaps between a stator and a rotor in both the end portions of a rotary shaft, and to which a separation gas in a gas state is supplied thereby preventing lubricating oil used in a bearing from being mixed into the seal portion;
a condenser which condenses and liquefies the refrigerant process gas, which has been compressed by the compressor, in a gas state;
a valve which adiabatically expands the refrigerant process gas, which has been condensed by the condenser, in a liquid state;
an evaporator which exchanges heat between the refrigerant process gas, which has been adiabatically expanded by the valve, in a liquid state and a target to be cooled, thereby cooling the target and evaporating the refrigerant process gas in a liquid state; and
a gas recovery system for the compressor that recovers mixed gas, wherein the mixed gas is a mixture of the refrigerant process gas which is compressed by the compressor and leaked into the seal portion and the separation gas in a gas state which is supplied to the seal portion of the compressor, from the seal portion, and separates the mixed gas into the refrigerant process gas and the separation gas in a gas state,
wherein the gas recovery system comprises:
a distillation column that brings the separation gas in a liquid state into contact with the mixed gas, thereby exchanging heat between the mixed gas and the separation gas in a liquid state to cool and liquefy the refrigerant process gas contained in the mixed gas, and heat and gasify the separation gas in a liquid state;
a process gas recovery line that is connected to a lower part of the distillation column and recovers the refrigerant process gas in a liquid state discharged from the lower part of the distillation column, the refrigerant process gas recovered through the process gas recovery line being supplied to the compressor; and
a supply gas recovery line that is connected to an upper part of the distillation column and recovers the separation gas in a gas state discharged from the upper part of the distillation column, the separation gas in a gas state being recovered through the supply gas recovery line and being supplied to the seal portion,
wherein the gas recovery system further comprises:
a process gas circulation line that branches from the process gas recovery line and returns the refrigerant process gas in a liquid state, which is discharged from the distillation column, to the distillation column after being gasified;
a supply gas circulation line that branches from the supply gas recovery line and returns the separation gas in a gas state, which is discharged from the distillation column, to the distillation column after being liquefied; and
a circulation heat exchanger that exchanges heat between the refrigerant process gas in a liquid state flowing through the process gas circulation line and the separation gas in a gas state flowing through the supply gas circulation line,
the separation gas in a gas state contained in the mixed gas in the distillation column is maintained in a gas state, and with the separation gas in a liquid state is heated and gasified by the refrigerant process gas contained in the mixed gas.

2. The refrigeration cycle system according to claim 1, wherein the refrigerant process gas is Freon or hydrocarbon, and the separation gas in a gas state is carbon dioxide or hydrocarbon.

3. The refrigeration cycle system according to claim 1, further comprising:
a mixed gas supply line that is connected to the distillation column and supplies the mixed gas to the distillation column; and
a mixed gas heat exchanger that exchanges heat between the refrigerant process gas flowing through the process gas recovery line and the mixed gas flowing through the mixed gas supply line, thereby cooling the mixed gas with the refrigerant process gas flowing through the process gas recovery line.

4. The refrigeration cycle system according to claim 3, further comprising:
an additional supply line for additionally supplying the refrigerant process gas in a liquid state to the process gas recovery line, between the distillation column and the mixed gas heat exchanger.

5. The refrigeration cycle system according to claim 4, wherein the mixed gas heat exchanger exchanges heat between the separation gas flowing through the supply gas recovery line and the mixed gas flowing through the mixed gas supply line, thereby cooling the mixed gas with the separation gas flowing through the supply gas recovery line.

6. The refrigeration cycle system according to claim 1, wherein the seal portion includes a dry gas seal, and a separation seal installed between a bearing of the compressor and the dry gas seal.

7. The refrigeration cycle system according to claim 6, further comprising:
- a second distillation column that brings the separation gas in a liquid state into a second mixed gas in which the separation gas is mixed with lubricating oil from the bearing of the compressor, thereby exchanging heat between the second mixed gas and the liquid separation gas to cool and liquefy the lubricating oil contained in the second mixed gas, and heat and gasify the liquid separation gas; and
- a second supply gas recovery line that is connected to an upper part of the second distillation column and recovers the separation gas in a gas state discharged from the upper part of the distillation column.

8. The refrigeration cycle system according to claim 1, wherein the seal portion includes a plurality of dry gas seals, and the separation supply gas is a seal gas supplied between the dry gas seals adjacent to each other.

9. The refrigeration cycle system according to claim 1, further comprising:
- a circulation compressor which raises the pressure of the separation gas, which has been drawn into the distillation column upper circulation line from the supply gas recovery line, in a gas state, and
- a circulation valve which adiabatically expands the gaseous separation supply gas flowing through the distillation column upper circulation line.

\* \* \* \* \*